United States Patent
Kim et al.

(10) Patent No.: US 11,411,443 B2
(45) Date of Patent: Aug. 9, 2022

(54) ELECTRONIC DEVICE AND METHOD FOR WIRELESSLY TRANSMITTING OR RECEIVING POWER

(71) Applicant: Samsung Electronics Co., Ltd., Gyeonggi-do (KR)

(72) Inventors: Kyoungwon Kim, Gyeonggi-do (KR); Yusu Kim, Gyeonggi-do (KR); Kyungmin Park, Gyeonggi-do (KR); Juhyang Lee, Gyeonggi-do (KR); Byungyeol Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/288,624

(22) PCT Filed: Oct. 25, 2019

(86) PCT No.: PCT/KR2019/014198
§ 371 (c)(1),
(2) Date: Apr. 26, 2021

(87) PCT Pub. No.: WO2020/085865
PCT Pub. Date: Apr. 30, 2020

(65) Prior Publication Data
US 2021/0399591 A1    Dec. 23, 2021

(30) Foreign Application Priority Data
Oct. 26, 2018    (KR) ........................ 10-2018-0129053

(51) Int. Cl.
*H02J 50/80* (2016.01)
*H02J 50/12* (2016.01)
(Continued)

(52) U.S. Cl.
CPC .............. *H02J 50/80* (2016.02); *H02J 50/12* (2016.02); *H04B 5/0037* (2013.01); *H04B 5/0081* (2013.01); *H04L 27/02* (2013.01)

(58) Field of Classification Search
CPC ........ H02J 50/80; H02J 50/12; H04B 5/0037; H04B 5/0081; H04L 27/02
See application file for complete search history.

(56) References Cited

U.S. PATENT DOCUMENTS 9,425,746 B2    8/2016  Uzunkol et al.
9,647,725 B1 *  5/2017  Gay ..................... H02J 50/12
(Continued)

FOREIGN PATENT DOCUMENTS

KR    10-2016-0017626 A    2/2016
KR    10-2016-0052233 A    5/2016
(Continued)

*Primary Examiner* — Pinping Sun
(74) *Attorney, Agent, or Firm* — Cha & Reiter, LLC

(57) ABSTRACT

An electronic device according to various embodiments may be configured to cause a control circuit to: control a first switch, a second switch, or a combination of the first switch and the second switch, in order to electrically connect a ground terminal to a first capacitor, a second capacitor, or a combination of the first capacitor and the second capacitor, while the electronic device operates in a first mode for providing power to a first external electronic device; control the first switch and the second switch in order to electrically disconnect the first capacitor and the second capacitor from the ground terminal, and control the third switch in order to control a path of an electrical signal which passes through the fourth capacitor, while the electronic device operates in a second mode for acquiring power from a second external electronic device.

15 Claims, 11 Drawing Sheets

(51) Int. Cl.
*H04B 5/00* (2006.01)
*H04L 27/02* (2006.01)

(56) References Cited

U.S. PATENT DOCUMENTS

| | | | |
|---|---|---|---|
| 2010/0109796 A1* | 5/2010 | Park | H01P 1/213 333/103 |
| 2010/0210207 A1* | 8/2010 | Goto | H01Q 1/2208 455/41.1 |
| 2013/0147279 A1* | 6/2013 | Muratov | H02J 7/00036 307/104 |
| 2014/0093110 A1* | 4/2014 | Kilsgaard | H04R 25/554 381/315 |
| 2015/0318712 A1* | 11/2015 | Lee | H02J 50/12 307/104 |
| 2016/0105034 A1* | 4/2016 | Lee | H02J 50/12 307/104 |
| 2016/0126779 A1 | 5/2016 | Park | |
| 2017/0093222 A1* | 3/2017 | Joye | H04B 5/0087 |
| 2017/0271925 A1* | 9/2017 | Plekhanov | H02J 50/40 |
| 2018/0034506 A1* | 2/2018 | Moore | H02J 50/60 |
| 2018/0048987 A1* | 2/2018 | Morris | H04W 4/50 |
| 2018/0159359 A1 | 6/2018 | Park et al. | |
| 2019/0312459 A1* | 10/2019 | Garbus | H02J 7/00034 |
| 2020/0036400 A1* | 1/2020 | Kim | H04B 17/12 |
| 2020/0274397 A1 | 8/2020 | Hwang et al. | |

FOREIGN PATENT DOCUMENTS

| | | | | |
|---|---|---|---|---|
| KR | 10-2017-0141101 A | 12/2017 | | |
| KR | 10-2018-0106217 A | 10/2018 | | |
| WO | WO-2017056353 A1 * | 4/2017 | | H04B 5/02 |
| WO | 2017/176128 A1 | 10/2017 | | |
| WO | 2018/039486 A1 | 3/2018 | | |

* cited by examiner

ELECTRONIC DEVICE AND METHOD FOR WIRELESSLY TRANSMITTING OR RECEIVING POWER

CROSS REFERENCE TO RELATED APPLICATIONS

This application is a National Phase Entry of PCT International Application No. PCT/KR2019/014198, which was filed on Oct. 25, 2019, and claims a priority to Korean Patent Application No. 10-2018-0129053, which was filed on Oct. 26, 2018, the contents of which are incorporated herein by reference.

TECHNICAL FIELD

Various embodiments disclosed in the present document relate to an electronic device for transmitting or receiving power by wireless and a method thereof.

BACKGROUND ART

An electronic device can include a power transceiver for acquiring power by wireless or providing power by wireless. This power transceiver can acquire wireless power from an external electronic device through an internal coil, or provide wireless power to the external electronic device.

DISCLOSURE OF INVENTION

Technical Problem

Because a power transceiver of an electronic device can include analog elements, a signal induced within the electronic device while wireless power is being provided to the external electronic device can have unintended values. Accordingly, a way for decreasing the unintended signal values can be demanded.

On the other hand, while acquiring wireless power from the external electronic device, the electronic device can transmit a signal to the external electronic device providing the wireless power. Accordingly, a way for modulating the signal can be demanded.

Technological solutions the present document seeks to achieve are not limited to the above-mentioned technological solutions, and other technological solutions not mentioned above would be able to be clearly understood by a person having ordinary skill in the art from the following statement.

Solution to Problem

An electronic device of various embodiments can include a power transceiver, a coil configured to transmit, by wireless, a signal for offering power to an external electronic device, or receive, by wireless, a signal for acquiring power from the external electronic device, a first capacitor electrically connectable to the coil, a first switch configured to electrically connect, or disconnect, an end of the first capacitor to a ground terminal, a second capacitor electrically connectable to the coil, a second switch configured to electrically connect, or disconnect, an end of the second capacitor to the ground terminal, a third capacitor electrically connectable to the power transceiver, a fourth capacitor electrically connectable the third capacitor and the power transceiver, a third switch configured to electrically connect, or disconnect, an end of the fourth capacitor to the ground terminal, and a control circuit. The control circuit can be configured to control the first switch, the second switch, or a combination of the first switch and the second switch, in order to electrically connect the first capacitor, the second capacitor, or a combination of the first capacitor and the second capacitor to the ground terminal, while the electronic device operates in a first mode for offering power to a first external electronic device, and control the first switch and the second switch, in order to electrically disconnect the first capacitor and the second capacitor from the ground terminal, and control the third switch in order to control a path of an electrical signal which passes through the fourth capacitor, while the electronic device operates in a second mode for acquiring power from a second external electronic device.

An electronic device of various embodiments can include a communication circuit, a power transceiver, a coil configured to transmit, by wireless, a signal for offering power to an external electronic device, or receive, by wireless, a signal for acquiring power from the external electronic device, connection circuitry connecting between the coil and the power transceiver, and a control circuit. The control circuit can be configured to identify that a frequency used for communication between the electronic device and a second external electronic device changes from a first frequency within a specified frequency band to a second frequency within the specified frequency band, by using the communication circuit supporting communication through an antenna distinct from the coil, while the electronic device operates in a first mode for offering power to a first external electronic device, and change an impedance value of the connection circuitry, on the basis of the identifying.

Advantageous Effects of Invention

By converting an electrical connection path between an internal coil and a power transceiver, an electronic device of various embodiments and a method thereof can efficiently offer wireless power to an external electronic device, or acquire from the external electronic device.

An effect obtainable from the present disclosure is not limited to the above-mentioned effects, and other effects not mentioned will be able to be apparently understood from the following statement by a person having ordinary skill in the art to which the disclosure pertains.

BRIEF DESCRIPTION OF DRAWINGS

In relation with a description of the drawings, the same or corresponding component can be given the same reference numeral.

BEST MODE FOR CARRYING OUT THE INVENTION

Figure 1:
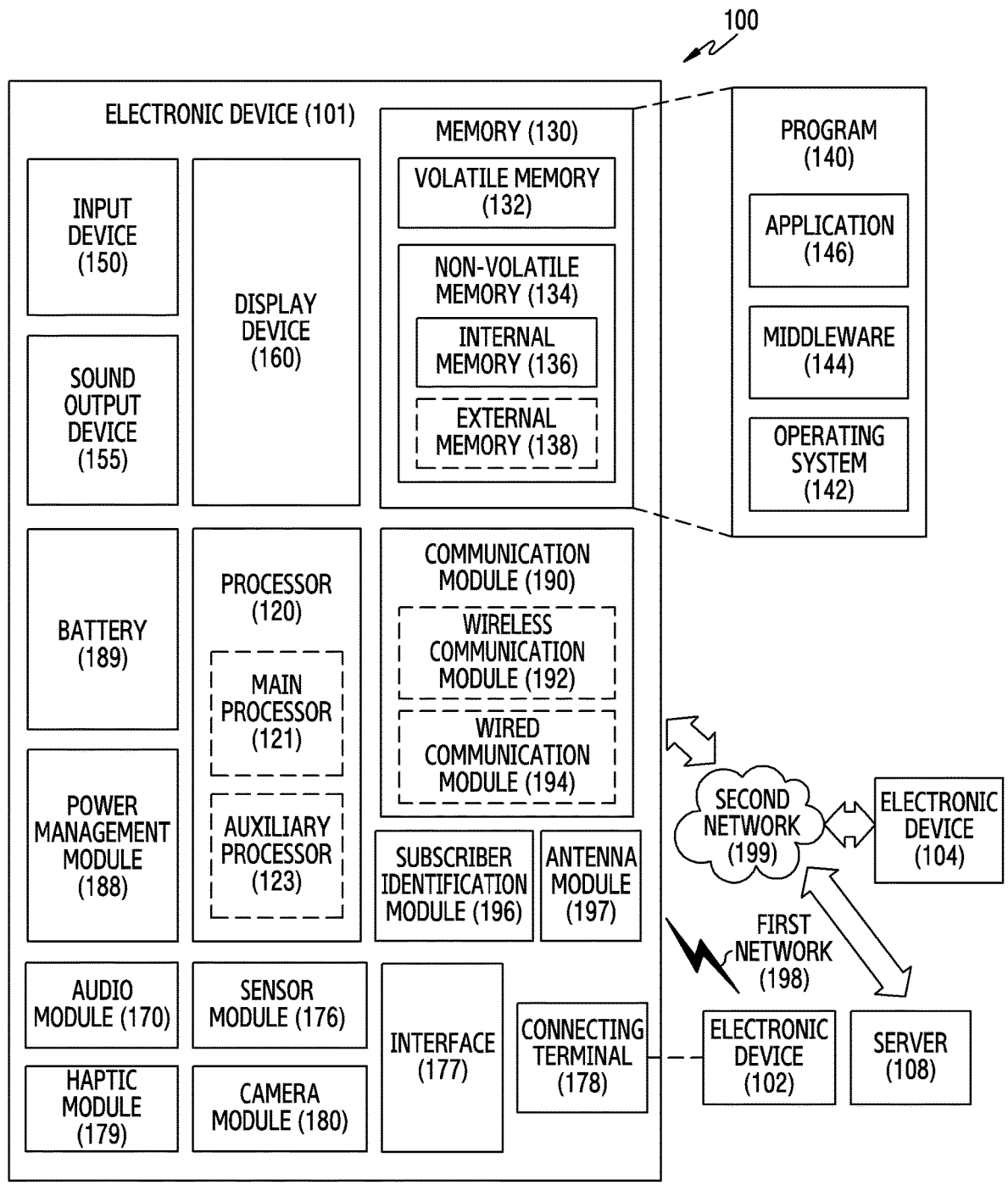
FIG. 1 is a block diagram of an electronic device within a network environment according to various embodiments.

FIG. 1 is a block diagram of an electronic device within a network environment according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
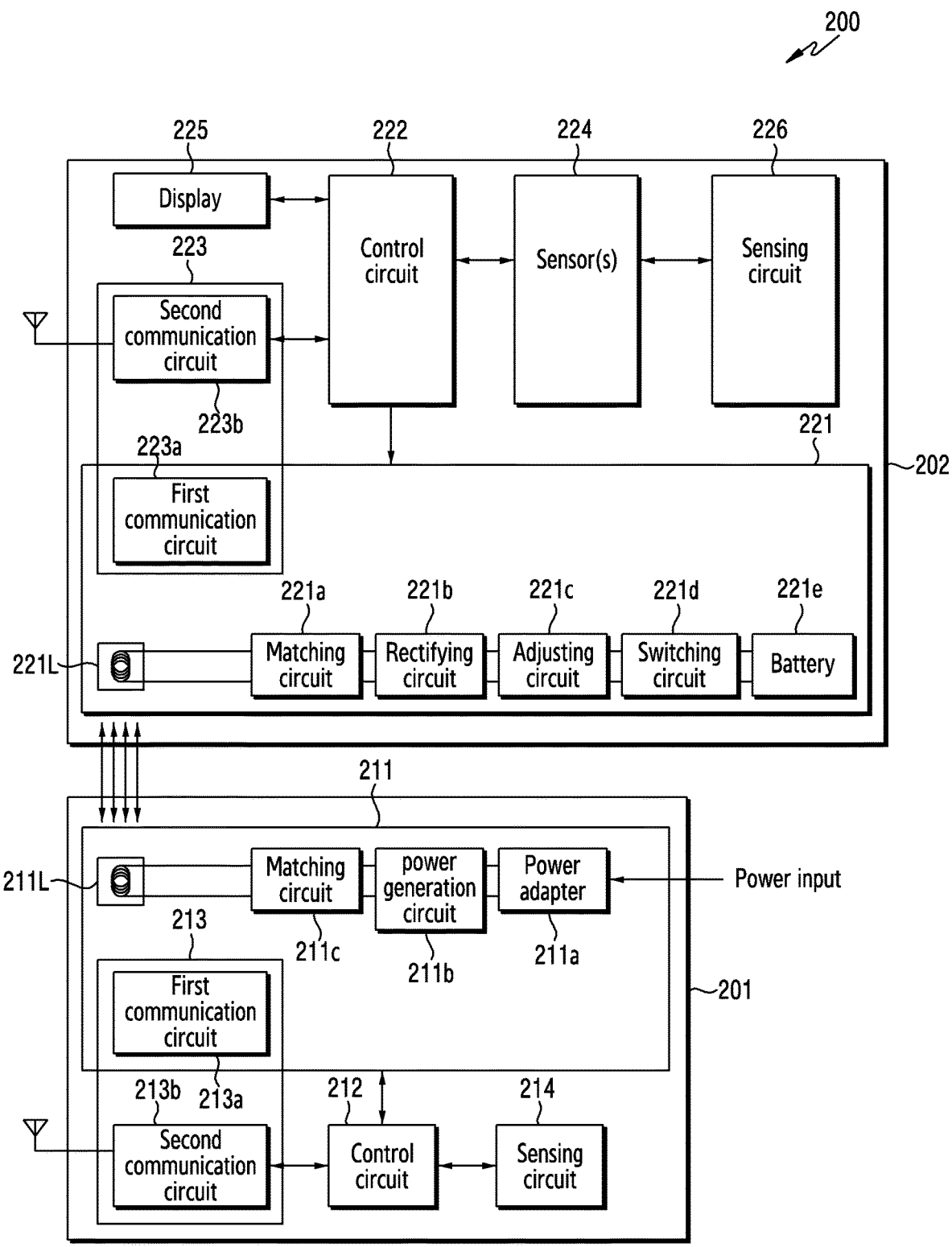
FIG. 2A is a diagram illustrating a wireless charging environment according to various embodiments.

FIG. 2A is a diagram illustrating a wireless charging environment according to various embodiments.

Referring to FIG. 2A, the wireless charging environment 200 can include an electronic device 201 and an electronic device 202. In various embodiments, the electronic device 201 can mean an electronic device (e.g., 101 of FIG. 1) operating in a first mode (or a first function) for offering power to an external electronic device, and the electronic device 202 can mean the electronic device 101 operating in a second mode (or a second function) for acquiring power from the external electronic device. In other words, the electronic device 201 and the electronic device 202 can consist of one electronic device 101, and the electronic device 101 including all of the electronic device 201 and the electronic device 202 can operate like the electronic device 201 in the first mode, and operate like the electronic device 202 in the second mode.

In a description of FIG. 2A, the electronic device 201 can be referred to as a power transmitting device 201 in aspects of operating in the first mode, and the electronic device 202 can be referred to as a power receiving device 202 in aspects of operating in the second mode.

According to various embodiments, the power transmitting device 201 can include a power transmitting circuit 211, a control circuit 212, a communication circuit 213, or a sensing circuit 214.

According to various embodiments, the power transmitting circuit 211 can include a power adapter 211a capable of receiving power from the external, and properly converting a voltage of the received power, a power generation circuit 211b for generating power, or a matching circuit 211c for maximizing an efficiency between a transmitting coil 211L and a receiving coil 221L.

According to various embodiments, the power transmitting circuit 211 can include, in plural, at least some of the power adapter 211a, the power generation circuit 211b, the transmitting coil 211L, the matching circuit 211c, or a combination thereof wherein power transmission is possible to a plurality of power receiving devices (e.g., a first external electronic device and a second external electronic device).

According to various embodiments, the power transmitting circuit 211 can supply battery power or external power to the power generation circuit 211b by using the power adapter 211a.

According to various embodiments, the power transmitting circuit 211 can provide a signal for supplying power to the external electronic device by using the power generation circuit 211b, and the signal can be forwarded to the transmitting coil 211L.

According to various embodiments, by using the power generation circuit 211b, the power transmitting circuit 211 can provide a first signal of a first frequency band for offering first power to a first external electronic device and a second signal of a second frequency band for offering second power to a second external electronic device. The first signal of the first frequency band and the second signal of the second frequency band can be provided when the transmitting coil 211L includes a multi-coil structure.

According to various embodiments, the control circuit 212 can perform the general control of the power transmitting device 201, and provide various messages necessary for wireless power transmission and forward the same to the communication circuit 213. In an embodiment, the control circuit 212 can calculate power (or energy) which will be sent out to the power receiving device 202, on the basis of information received from the communication circuit 213. In an embodiment, the control circuit 212 can control the power transmitting circuit 211 wherein power provided by the transmitting coil 211L is transmitted to the power receiving device 202.

According to various embodiments, in response to transmitting power to each of a plurality of power receiving devices (e.g., the first external electronic device and the second external electronic device), the control circuit 212 can control the power generation circuit 211b to provide a first signal of a first frequency band for offering first power to the first external electronic device and a second signal of a second frequency band for offering second power to the second external electronic device. For this, the transmitting coil 211L can include the multi-coil structure.

According to various embodiments, the communication circuit 213 can include at least one of a first communication circuit 213a or a second communication circuit 213b. The first communication circuit 213a, for example, can communicate with a first communication circuit 223a of the power receiving device 202 by using a frequency band which is the same as or is adjacent to a frequency band used for power transmission in the transmitting coil 211L.

By using the transmitting coil 211L, the first communication circuit 213a can communicate with the first communication circuit 223a of the power receiving device 202. By using the transmitting coil 211L, data (or a communication signal) provided by the first communication circuit 213a can be transmitted to the first communication circuit 223a of the power receiving device 202. By using a frequency shift keying (FSK) modulation scheme, the first communication circuit 213a can forward data to the power receiving device 202. According to various embodiments, the first communication circuit 213a can communicate with the first communication circuit 223a of the power receiving device 202, by allowing a change of a frequency band of a power signal forwarded via the transmitting coil 211L. Or, the first communication circuit 213a can communicate with the first communication circuit 223a of the power receiving device 202, by allowing data or a communication signal to be included in a power signal provided in the power generation circuit 211b. For example, the first communication circuit 213a can express the data, by increasing or decreasing a frequency band of a power transmission signal.

The second communication circuit 213b, for example, can communicate (e.g., an outband scheme) with a second communication circuit 223b of the power receiving device 202 by using a frequency band different from a frequency band used for power forwarding in the transmitting coil 211L. For example, by using any one of various short-range communication schemes such as Bluetooth, Bluetooth low energy (BLE), Wi-Fi, and near field communication (NEC), the second communication circuit 213b can acquire information (e.g., voltage value information after a rectifier, rectified voltage value information (e.g., Vrect), information (e.g., Tout) on an electric current flowing in a coil or a rectifying circuit, various packets, a message, etc.) related to a charging state of the power receiving device 202 from the second communication circuit 223b.

According to various embodiments, the sensing circuit 214 can include at least one or more sensors and, by using the at least one or more sensors, can sense at least one state of the power transmitting device 201.

According to various embodiments, the sensing circuit 214 can include at least one of a temperature sensor, a motion sensor, or a current (or voltage) sensor. The sensing circuit 214 can sense a temperature state of the power transmitting device 201 by using the temperature sensor, and can sense a motion state of the power transmitting device 201 by using the motion sensor, and can sense a state, for example, a current amplitude, a voltage amplitude, or a power amplitude, of an output signal of the power transmitting device 201 by using the current (or voltage) sensor.

According to an embodiment, the current (or voltage) sensor can measure a signal in the power transmitting circuit 211. For example, the current (or voltage) sensor can measure a signal in at least partial region of the matching circuit 211c or the power generation circuit 211b. The current (or voltage) sensor can include a circuit for measuring a signal in a stage before the transmitting coil 211L.

According to various embodiments, the sensing circuit 214 can be a circuit for foreign object detection (FOD).

According to various embodiments, the power receiving device 202 can include a power receiving circuit 221 (e.g., the power management module 188 of FIG. 1), a control circuit 222 (e.g., the processor of FIG. 1), a communication circuit 223 (e.g., the communication module 190 of FIG. 1), at least one sensor 224 (e.g., the sensor module 176 of FIG. 1), a display 225 (e.g., the display device 160 of FIG. 1), or a sensing circuit 226. A description of a construction of the power receiving device 202 corresponding to the power transmitting device 201 can be omitted in part.

According to various embodiments, the power receiving circuit 221 can include the receiving coil 221L for receiving power by wireless from the power transmitting device 201, a matching circuit 221a, a rectifying circuit 221b for rectifying received AC power to DC power, an adjusting circuit 221c for adjusting a charging voltage, a switching circuit 221d, or a battery 221e (e.g., the battery 189 of FIG. 1).

According to various embodiments, the control circuit 222 can perform the general control of the power receiving device 202, and provide various messages necessary for wireless power reception and forward the same to the communication circuit 223.

According to various embodiments, the communication circuit 223 can include at least one of the first communication circuit 223a or the second communication circuit 223b. The first communication circuit 223a can communicate with the power transmitting device 201 via the receiving coil 221L.

The first communication circuit 223a can communicate with the first communication circuit 213a of the power transmitting device 201, by using the receiving coil 221L. Data (or a communication signal) provided by the first communication circuit 223a can be transmitted to the power transmitting device 201, by using the receiving coil 221L. By using an amplitude shift keying (ASK) modulation scheme, the first communication circuit 223a can forward data to the power transmitting device 201. The second communication circuit 223b can communicate with the power transmitting device 201 by using any one of various short-range communication schemes such as Bluetooth, BLE, Wi-Fi, and NFC.

According to various embodiments, at least one sensor 224 can include at least some of a current (or voltage) sensor, a temperature sensor, an illuminance sensor, or a sound sensor.

According to various embodiments, the display 225 can display various display information necessary for wireless power transmission and/or reception.

According to various embodiments, the sensing circuit 226 can sense a search signal sent from the power transmitting device 201 or power received from the power transmitting device 201, and sense the power transmitting device 201. The sensing circuit 226 can sense a signal variation of an input and/or output stage of the receiving coil 221L, the matching circuit 221a, or the rectifying circuit 221b, induced by a coil signal provided by a signal outputted from the power transmitting device 201. According to various embodiments, the sensing circuit 226 can be included in the receiving circuit 221 as well.

Figure 2B:
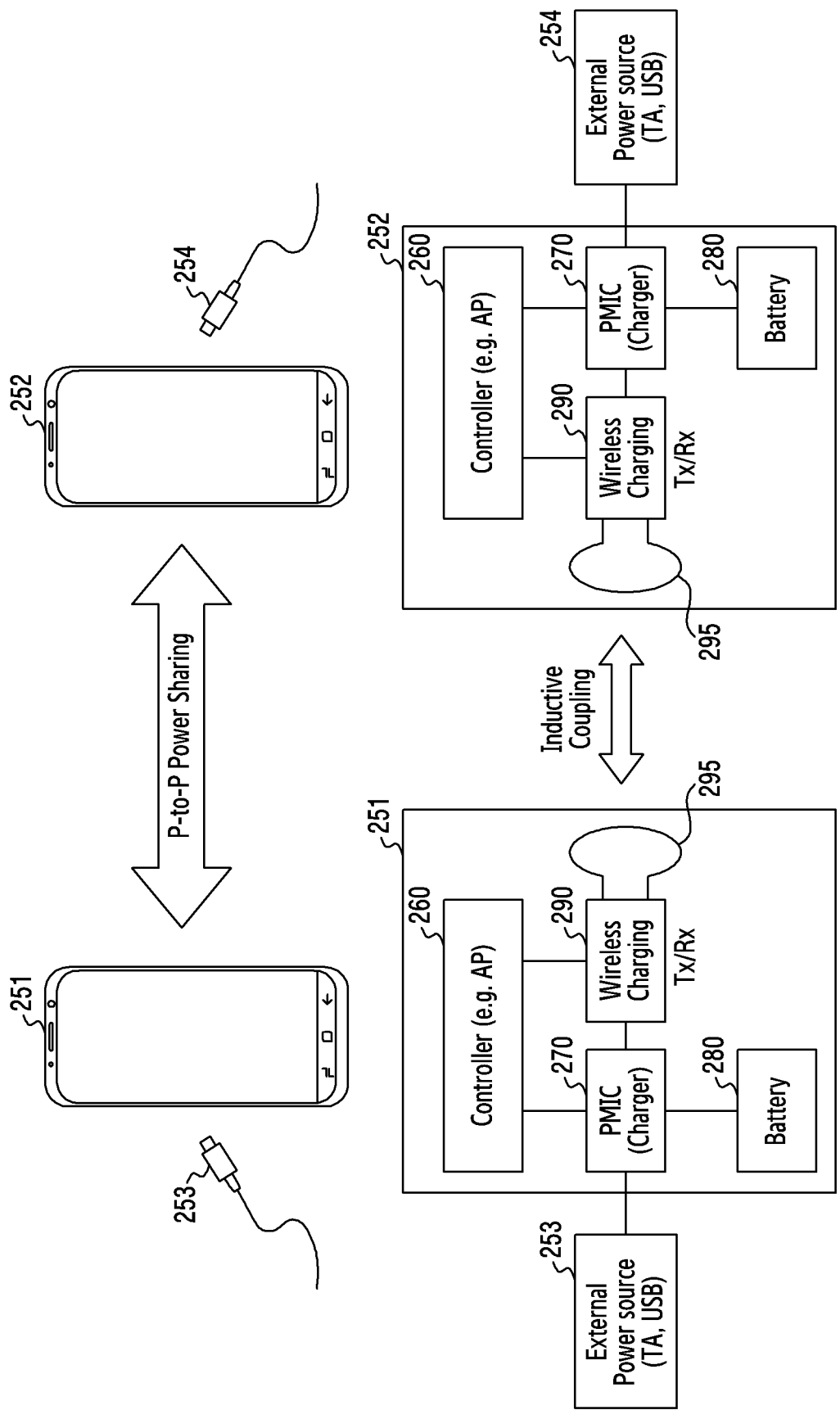
FIG. 2B is a basic conceptual diagram for sharing power by wireless between a first electronic device and a second electronic device.

FIG. 2B is a basic conceptual diagram for sharing power by wireless between a first electronic device and a second electronic device.

In FIG. 2B, the first electronic device 251 (e.g., the electronic device 101 of FIG. 1) and the second electronic device 252 (e.g., the electronic device 102 of FIG. 1) all have been expressed as devices in which wireless power transmission and reception are possible, but any one device among the first electronic device 251 and the second electronic device 252 can be possible to perform only wireless power reception as well. In the present document, a description is made with a criterion of the first electronic device 251, and a description is made in which the second electronic device 252 is an external electronic device, and the second electronic device 252 can be the same construction as the first electronic device 251 or be a construction not including a wireless power transmitting function.

According to an embodiment, the first electronic device 251 can include a coil 295, a wireless charging IC 290, a power management IC (PMIC) 270 (e.g., the power management module 188 of FIG. 1), a battery 280 (e.g., the battery 189 of FIG. 1), an external connection terminal 253 (e.g., a USB), and/or a control circuit 260 (controller) (e.g., the processor 120 of FIG. 1).

According to an embodiment, the coil 295 can be formed in a spiral shape in an FPCB included in the first electronic device 251.

According to an embodiment, the wireless charging IC 290 can include a full bridge circuit. For example, the wireless charging IC 290 can control to drive the full bridge circuit by an inverter (DC→AC) in a wireless power transmitting operation, and control to drive the full bridge circuit by a rectifier (AC→DC) in a wireless power receiving operation.

According to an embodiment, the wireless charging IC 290 can exchange information necessary for wireless power transmission with the second electronic device 252 through in-band communication, according to at least a part of the WPC standard (or non-standard). For example, the in-band communication can be a scheme capable of exchanging data between the first electronic device 251 and the second electronic device 252 through frequency or amplitude modulation of a wireless power transmission signal, in a wireless power transmission situation between the coil 295 of the first electronic device 251 and the coil 295 of the second electronic device 252. According to various embodiments, communication between the first electronic device 251 and the second electronic device 252 can use out-band communication as well. For example, the out-band communication can be short-range communication such as NFC, Bluetooth, or WiFi, which is different from that of a wireless power signal.

According to an embodiment, the PMIC 270 can include a charger function of charging wired and wireless input power to the battery 280, a function of communicating (e.g., USB battery charging spec, USB power delivery (PD) communication, AFC communication, and/or quick charge (QC) communication) with an external power source device (e.g., a travel adapter) connected to a USB terminal, a function of supplying necessary power to a system and supplying power suitable to a required voltage level every element, and/or a function of supplying power to the wireless charging IC 290 in a wireless power transmission mode.

According to an embodiment, the external connection terminal 253 or 254 can be a terminal complying with the USB standard. For example, the external connection terminal 253 or 254 can be an interface for USB charging and/or on the go (OTG) power source supplying. According to an embodiment, the external connection terminal 253 or 254 can be connected to an external power source (a TA or a battery pack, etc.).

According to an embodiment, the control circuit 260 can integratedly control a wired/wireless charging function of the first electronic device 251, a USB communication function with the second electronic device 252, and/or a communication (e.g., USB PD, BC1.2, AFC, and/or QC) function with the second electronic device 252, according to a situation (or state) of the first electronic device 251. For example, the BC1.2 or the PD, etc. can be an interface for communicating with the external power source (TA), and the control circuit 260 can control the communication with the external power source. For example, the situation of the first electronic device 251 can include a temperature of the first electronic device 251 and/or a capacity of the battery 280 of the first electronic device 251.

According to various embodiments, the first electronic device 251 (e.g., the electronic device 101 of FIG. 1 or the electronic device 201 of FIG. 2A) can operate in a wireless power Tx mode (or a wireless power Tx function) by using the battery 280. Or, in response to a wired power supplying device having been connected, the first electronic device 251 can operate in a transmission mode (a Tx mode) by using external power received from the wired power supplying device. Or, in response to the wired power supplying device having been connected, the first electronic device 251 can preferentially utilize the external power received from the wired power supplying device, for an operation in the Tx mode, and charge the remaining power to the battery 280. In response to the wired power supplying device having been connected, the first electronic device 251 can supply the external power received from the wired power supplying device to the wireless charging IC 290, and charge at least part of the remaining power to the battery 280.

Figure 3:
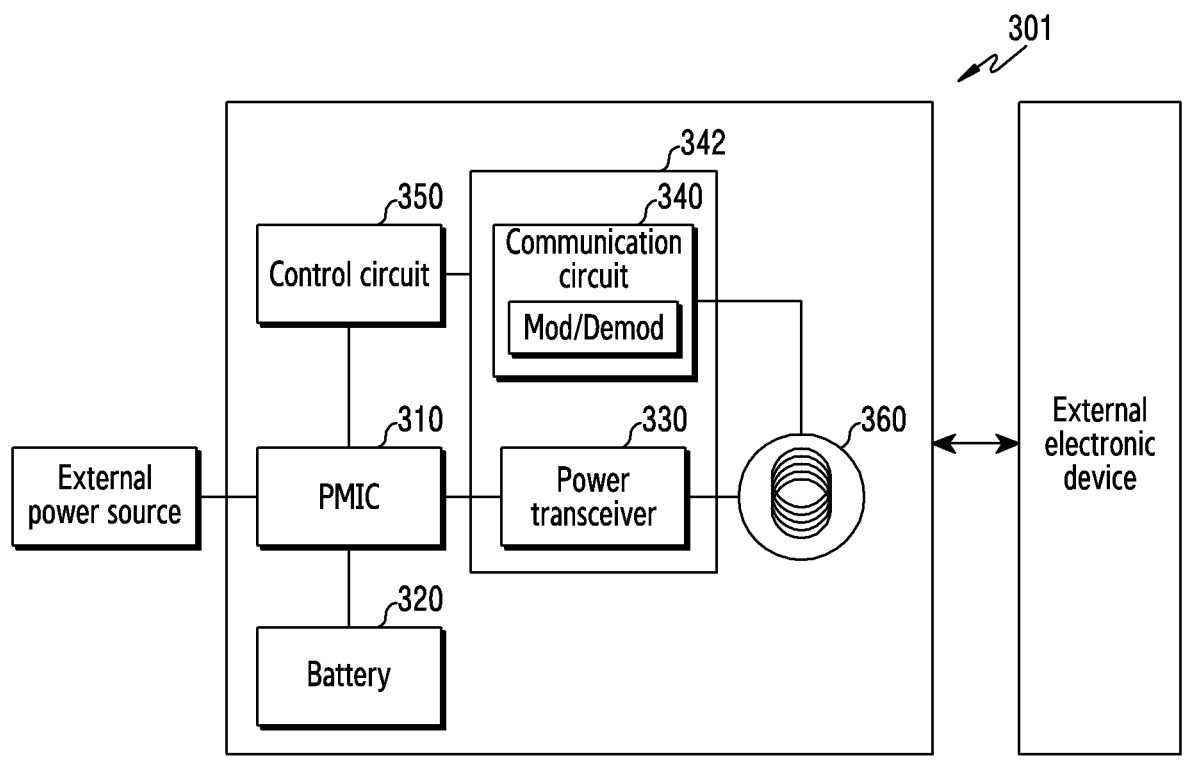
FIG. 3 is a diagram illustrating an example of a functional construction of an electronic device according to various embodiments.

FIG. 3 is a diagram illustrating an example of a functional construction of an electronic device according to various embodiments.

According to various embodiments, the electronic device 301 (e.g., the electronic device 101 of FIG. 1, the electronic device 201 of FIG. 2A, the electronic device 202 of FIG. 2A, the electronic device 251 of FIG. 2B, or the electronic device 252 of FIG. 2B) can supply power by wireless to an external electronic device (e.g., the electronic device 102 of FIG. 1), or receive power by wireless from another external electronic device.

Referring to FIG. 3, the electronic device 301 can include a PMIC 310, a battery 320, a power transceiver 330, a communication circuit 340, a control circuit 350, and a coil 360.

In various embodiments, the PMIC 310 can include the power management module 188 illustrated in FIG. 1.

In various embodiments, the battery 320 can offer power necessary for driving of the electronic device 301 or components within the electronic device 301. In various embodiments, the battery 320 can be constructed to be rechargeable.

The power transceiver 330 can be used to offer power to the external electronic device by wireless, or acquire power from the external electronic device by wireless.

In various embodiments, the power transceiver 330 can provide a signal for offering power to the external electronic device. For example, the signal can be provided on the basis of another signal which is received by the power transceiver 330 from the battery 320 (or is received by the power transceiver 330 from the battery 320 through the PMIC 310). In various embodiments, for the sake of provision of the signal, the power transceiver 330 can include the power adapter 211a, the power generation circuit 211b, the matching circuit 211c, illustrated in FIG. 2, or a combination thereof.

In various embodiments, the provided signal can be transmitted to the external electronic device through the coil 360. For example, the signal transmitted to the external electronic device can be used within the external electronic device in order to charge a rechargeable battery of the external electronic device. However, an embodiment is not limited to this.

In various embodiments, the power transceiver 330 can provide a signal for acquiring power from the external electronic device. In various embodiments, for the sake of provision of the signal, the power transceiver 330 can include the matching circuit 221a, the rectifying circuit 221b, the adjusting circuit 221c, and the switching circuit 221d, illustrated in FIG. 2. In various embodiments, the signal can be provided based on another signal received from the coil 360. In various embodiments, the signal can be electromagnetically induced and provided from a signal transmitted from the external electronic device to the coil 360. The power transceiver 330 can offer the provided signal to the battery 320 through the PMIC 310, or directly offer to the battery 320. The signal offered to the battery 320 can be used to recharge the battery 320.

In various embodiments, the power transceiver 330 can enable or disable at least one component (e.g., a first capacitor to be described later, a second capacitor, or a combination thereof) for offering power to the external electronic device, on the basis of a control signal or control information received from the control circuit 350.

In various embodiments, the coil 360 can receive, from the power transceiver 330, a signal for offering power to the external electronic device, while the electronic device 301 operates in a first mode (or by a first function) for offering power to the external electronic device. In various embodiments, the coil 360 can offer, to the external electronic device, another signal electromagnetically induced from the received signal. In various embodiments, the another signal can be used to recharge the rechargeable battery of the external electronic device.

In various embodiments, the coil 360 can receive a signal for recharging the battery 320 of the electronic device 301 from the external electronic device, while the electronic device 301 operates in a second mode (or by a second function) for acquiring power from the external electronic device. In various embodiments, the coil 360 can offer, to the power transceiver 330, another signal electromagnetically induced from the signal received from the external electronic device.

In various embodiments, the communication circuit 340 can include a first communication circuit (e.g., 213a or 223a of FIG. 2A) performing communication with the external electronic device through the coil 360. In various embodiments, the communication circuit 340 can include an auxiliary processor (e.g., 123 of FIG. 1). For example, the auxiliary processor 123 can include the communication processor exemplified through FIG. 1. In various embodiments, the communication processor can be included in the control circuit 350 according to implementation as well.

In various embodiments, the power transceiver 330 and the communication circuit 340 can be implemented as one circuit. In response to the power transceiver 330 and the communication circuit 340 being implemented as one circuit, the circuit including the power transceiver 330 and the communication circuit 340 can be referred to as a power management circuit 342.

In various embodiments, the control circuit 350 can be used to control the PMIC 310, the power management circuit 342, or a combination thereof. In various embodiments, the control circuit 350 can control the power transceiver 330, based on a mode (e.g., the first mode or the second mode) (or the first function or second function) of the electronic device 301. For example, the control circuit 350 can control the power transceiver 330 in order to activate at least one first component (e.g., the first capacitor to be described later, the second capacitor, or a combination thereof) of the power transceiver 330, while the electronic device 301 operates in the first mode. In accordance with embodiments, the at least one first component can be arranged outside the power transceiver 330 as well. For example, the at least one first component can be arranged between the power transceiver 330 and the coil 360. In various embodiments, the at least one first component each can be connected with, or be disconnected from, a ground terminal via a switch. For another example, the control circuit 350 can control the power transceiver 330 in order to inactivate the at least one first component, while the electronic device 301 operates in the second mode. In various embodiments, the inactivating of the at least one first component can mean that the at least one first component is disconnected from the ground terminal. For further example, the control circuit 350 can modulate a signal which will be transmitted to the external electronic device via the coil 360, by converting a connection state of at least one second component of the power management circuit 342, while the electronic device 301 operates in the second mode.

In various embodiments, the control circuit 350 can include the main processor 121, and the auxiliary processor 123, illustrated in FIG. 1. In various embodiments, the control circuit 350 can be a component distinct from the main processor 121 illustrated in FIG. 1 as well.

As described above, the electronic device 301 of various embodiments can efficiently offer wireless power to the external electronic device, or efficiently acquire wireless power from the external electronic device, by controlling the power management circuit 342 according to a mode (or a function) of the electronic device 301.

Figure 4A:
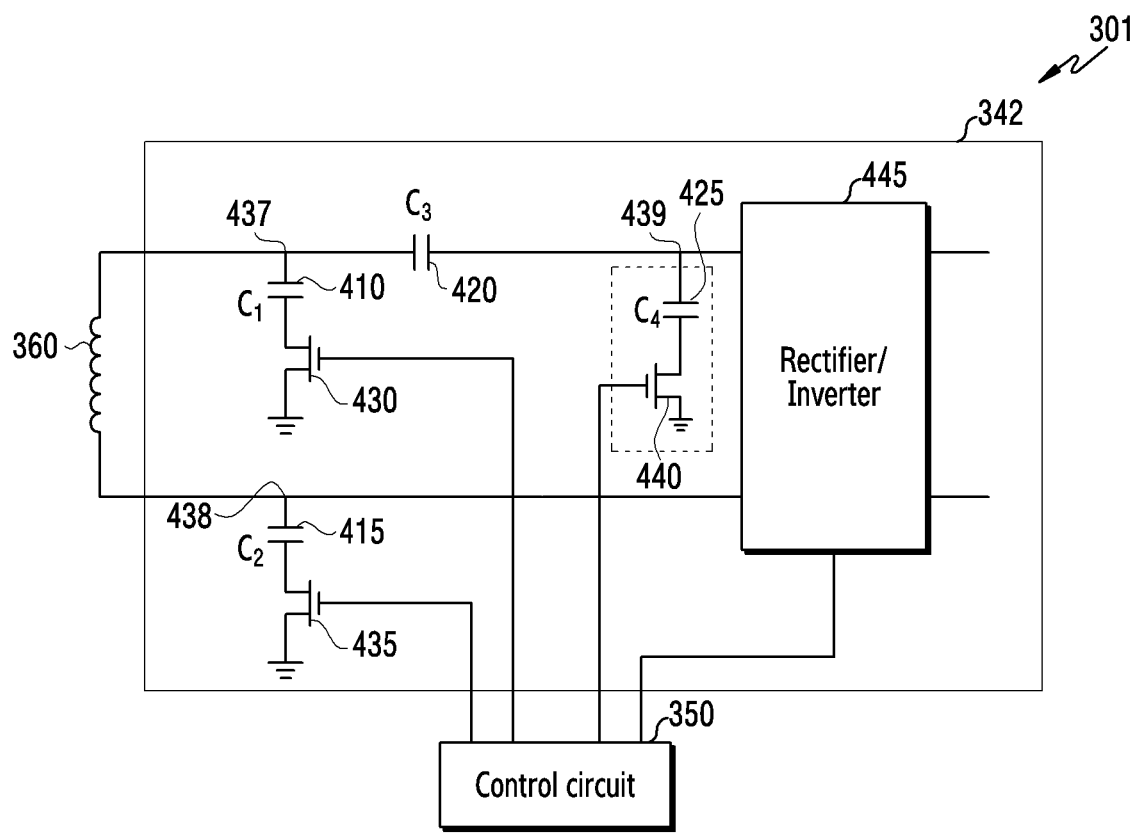
FIG. 4A is a diagram illustrating an example of a construction of a power management circuit within an electronic device according to various embodiments.

FIG. 4A is a diagram illustrating an example of a construction of a power management circuit within an electronic device according to various embodiments. This construction can be included in the power management circuit 342 of the electronic device 301 illustrated in FIG. 3. FIG. 4C is a graph for describing a function of a first capacitor included in the electronic device according to various embodiments.

Referring to FIG. 4A, the power management circuit 342 of the electronic device 301 can include a first capacitor 410, a second capacitor 415, a third capacitor 420, a fourth capacitor 425, a first switch 430, a second switch 435, a third switch 440, and a rectifier/inverter 445.

In various embodiments, the first capacitor 410 or the second capacitor 415 can be included in the power management circuit 342, in order to prevent a leakage inductance from being provided within the electronic device 301 while the electronic device 301 offers power to the external electronic device or while the electronic device 301 operates in a first mode (or by a first function). In various embodiments, the first capacitor 410 or the second capacitor 415 can support wherein a value of a signal for offering power to the external electronic device is maintained within a specified range, in order to prevent a voltage spike from being provided within a signal inputted to the coil 360. In various embodiments, the first capacitor 410 can be arranged in a connection portion 437 between the third capacitor 420 and the coil 360. In various embodiments, the first capacitor 410 or the second capacitor 415 can include a variable capacitor.

In various embodiments, the second capacitor 415 can be arranged in a connection portion 438 between the rectifier/inverter 445 and the coil 360. The second capacitor 415 and the second switch 435 can be constructed identically or similarly with the first capacitor 410 and the first switch 430, respectively. In accordance with embodiments, the second capacitor 415 and the second switch 435 can be omitted as well.

Referring to FIG. 4A and FIG. 4C, graph 480 can indicate an example of an overshoot portion of a signal shown in the connection portion 437 in response to the first capacitor 410 and the second capacitor 415 all not being connected to a ground terminal, and graph 481 can indicate an example of an overshoot portion of the signal shown in the connection portion 437 in response to the first capacitor 410, the second capacitor 415, or a combination thereof being connected to the ground terminal. Horizontal axes of graph 480 and graph 481 can indicate a time, and vertical axes of graph 480 and graph 481 can indicate a magnitude of a voltage. As confirmed through a comparison of graph 480 and graph 481, a variation 483 of the overshoot portion of the signal when the first capacitor 410, the second capacitor 415, or the combination thereof is connected to the ground terminal can be smaller than a variation 482 of the overshoot portion of the signal when the first capacitor 410 and the second capacitor 415 all are not connected to the ground terminal. The first capacitor 410 is arranged in the connection portion 437 and/or the second capacitor 415 is arranged in the connection portion 438, whereby the electronic device 301 of various embodiments can eliminate or decrease a high frequency harmonic for the signal. By eliminating or decreasing the high frequency harmonic for the signal, the electronic device 301 of various embodiments can improve radiated emission (RE) performance.

In various embodiments, the first switch 430 connected to the first capacitor 410 can be in a first state of connecting one terminal or end of the first capacitor 410 to a ground terminal while the electronic device 301 operates in the first mode, and can be in a second state of disconnecting the one terminal of the first capacitor 410 from the ground while the electronic device 301 operates in the second mode. In various embodiments, the term 'terminal" can be referred to as the term "end" as well. The conversion between the first state, and the second state, of the first switch 430 can be performed by the control circuit 350. For example, in response to identifying that the electronic device 301 operates in the first mode, the control circuit 350 can set a state of the first switch 430 to the first state, thereby electrically connecting the one terminal of the first capacitor 410 to the ground, and providing an electrical signal path which passes through the first capacitor 410. Or, in response to identifying that the electronic device 101 operates in the second mode, the control circuit 350 can set the state of the first switch 430 to the second state, thereby electrically disconnecting the one terminal of the first capacitor 410 from the ground, and may not provide an electrical signal path which passes through the first capacitor 410.

In various embodiments, a value of a capacitance ($C_1$) (or $C_2$) of the first capacitor 410 (or the second capacitor 415) can be configured variously. For example, the value of the capacitance ($C_1$) of the first capacitor 410 (or the capacitance $C_2$ of the second capacitor 415) can be configured as 1.5 (nF) to 100 (pF).

In various embodiments, the value of the capacitance ($C_1$) of the first capacitor 410 (or the capacitance ($C_2$) of the second capacitor 415) can be changed according to a frequency band which is used for communication with the external electronic device. In various embodiments, the external electronic device can be a device acquiring power from the electronic device 301 as well, and can be a device independent from acquiring the power as well. In response to performing communication with the external electronic device by using a frequency within a specified frequency band (e.g., a frequency band between 700 (MHz) to 900 (MHz)) among frequency bands used for the communication, the control circuit 350 can change the value of the capacitance ($C_1$) (or the capacitance ($C_2$)), in order to prevent a signal transmitted through the coil 360 so as to offer power to the external electronic device, from acting as interference in the communication. For example, in response to the frequency used for the communication being included within a band between 700 (MHz) to 800 (MHz), the control circuit 350 can configure the value of the capacitance ($C_1$) (or the capacitance ($C_2$)) as 1.5 (nF), and in response to the frequency used for the communication being included within a band between 800 (MHz) to 900 (MHz), can configure the value of the capacitance ($C_1$) (or the capacitance ($C_2$)) as 500 (pF). However, an embodiment is not limited to this.

In various embodiments, the fourth capacitor 425 can be included in the power management circuit 342 in order to modulate information which will be transmitted from the electronic device 301 to the external electronic device through the coil 360, while the electronic device 301 acquires power from the external electronic device or while the electronic device 301 operates in the second mode. The fourth capacitor 425 can be a variable capacitor. The fourth capacitor 425, for example, can be arranged in a connection portion 439 between the rectifier/inverter 445 and the third capacitor 420. In various embodiments, the modulating of the information can be performed on the basis of an amplitude shift keying (ASK) technique. In various embodiments, the modulating of the information can be performed by the control of the control circuit 350 or communication circuit 340. For example, by controlling the third switch 440 in order to modulate the information, the control circuit 350 may connect, or not connect, one terminal of the third capacitor 420 to the ground through the fourth capacitor 425. The information can be configured by a signal having a large modulation depth, on the basis of the control on the third switch 440.

In various embodiments, the third switch 440 connected to the fourth capacitor 425 can be in a first state of disconnecting one terminal of the fourth capacitor 425 from the ground while the electronic device 301 operates in the first mode, and can be in a second state of connecting the one terminal of the fourth capacitor 425 to the ground in at least a portion of a time duration in which the electronic device 301 operates in the second mode. The conversion between the first state, and the second state, of the third switch 440 can be performed by the control circuit 350. For example, the control circuit 350 can maintain a state of the third switch 440 in the first state only, while the electronic device 301 operates in the first mode. Or, the control circuit 350 can convert the state of the third switch 440 from the first state to the second state while the electronic device 301 operates in the second mode, or convert from the second state to the first state, thereby modulating the information.

In various embodiments, a value of a capacitance ($C_4$) of the fourth capacitor 425 can be configured variously. For example, the value of the capacitance ($C_4$) of the fourth capacitor 425 can be configured as 2.2 (nF) or more.

In various embodiments, the third capacitor 420 can be included in the power management circuit 342 in order to maintain wherein values of a signal transmitted or received through the coil 360 are within a specified range. In various embodiments, a value of a capacitance ($C_3$) of the third capacitor 420 can be configured variously.

In various embodiments, the rectifier/inverter 445 can be included in a power transceiver (e.g., 330 of FIG. 3) the power management circuit 342 includes. In various embodiments, the rectifier/inverter 445 can process a signal which will be transmitted through the coil 360 by using the power adapter 211a, the power generation circuit 211b, and the matching circuit 211c, illustrated in FIG. 2A, while the electronic device 301 operates in the first mode (or by the first function). In various embodiments, the rectifier/inverter 445 can process a signal received through the coil 360 by using the matching circuit 221a, the rectifying circuit 221b, the adjusting circuit 221c, the switching circuit 221d, and the battery 221e, illustrated in FIG. 2A, while the electronic device 301 operates in the second mode (or by the second function).

As described above, while operating in the first mode (or by the first function), the electronic device 301 of various embodiments can control the first capacitor 410, the second capacitor 415, or a combination thereof by using the first switch 430, the second switch 435, or a combination thereof, thereby efficiently offering power to the external electronic device. Also, while operating in the second mode (or by the second function), the electronic device 301 can control connection between the fourth capacitor 425 and the third capacitor 420 and connection between the fourth capacitor 425 and the rectifier/inverter 445 by using the third switch 440, thereby efficiently modulating information which will be transmitted to the external electronic device.

Figure 4B:
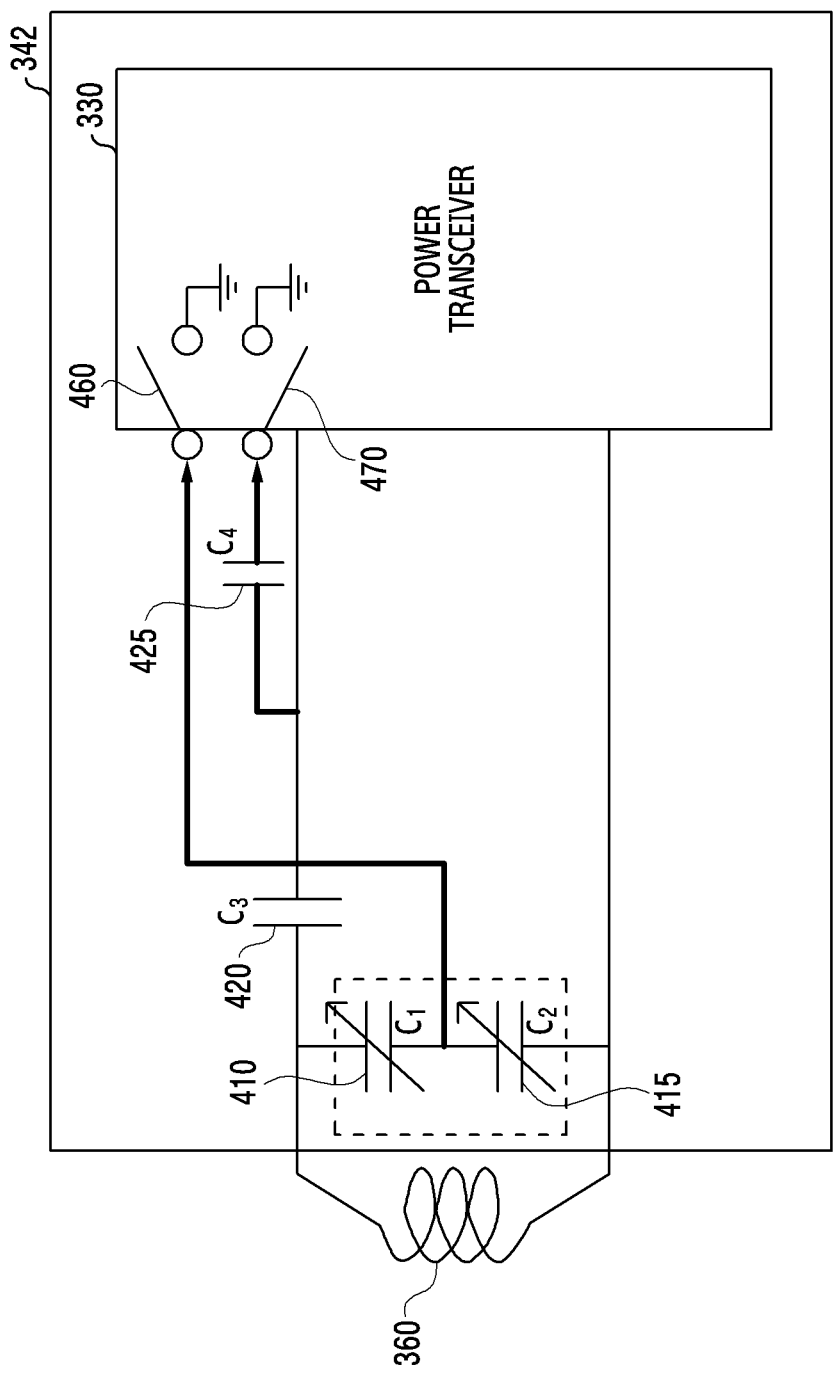
FIG. 4B is a diagram illustrating another example of a construction of a power management circuit within an electronic device according to various embodiments.
Figure 4C:
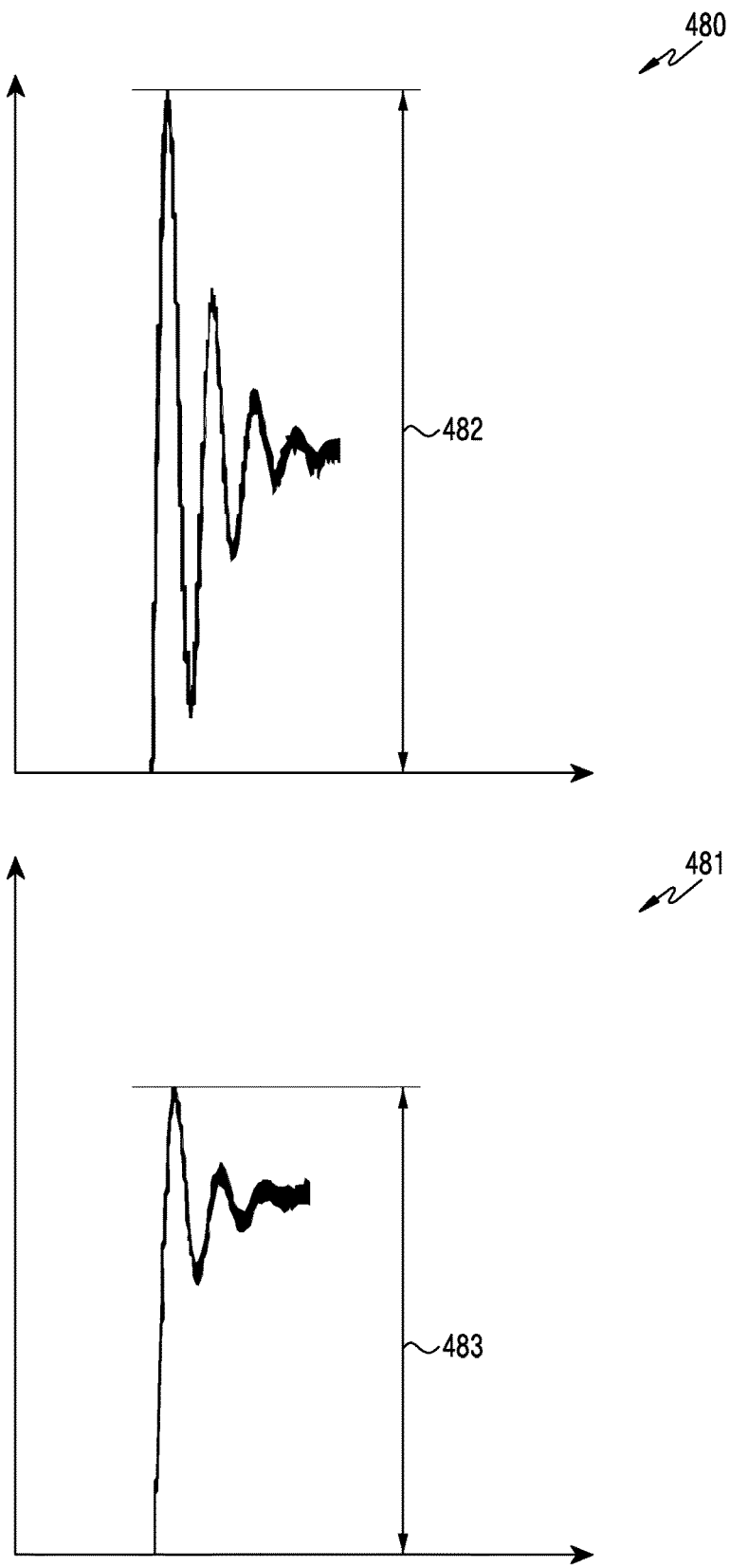
FIG. 4C is a graph for describing a function of a first capacitor included in an electronic device according to various embodiments.

FIG. 4B is a diagram illustrating another example of a construction of a power management circuit within an electronic device according to various embodiments. This construction can be included in the power management circuit 342 of the electronic device 301 illustrated in FIG. 3.

Referring to FIG. 4B, the power management circuit 342 can include the power transceiver 330, a first capacitor 410, a second capacitor 415, a third capacitor 420, and a fourth capacitor 425. In various embodiments, the power transceiver 330 can include a first switch 460 and a second switch 470.

The first capacitor 410, the second capacitor 415, the third capacitor 420, and the fourth capacitor 425, of FIG. 4B, can correspond to the first capacitor 410, the second capacitor 415, the third capacitor 420, and the fourth capacitor 425 mentioned earlier through FIG. 4A, respectively. In various embodiments, the first capacitor 410, the second capacitor 415, the fourth capacitor 425, or a combination thereof can be configured as a variable capacitor.

In various embodiments, the first switch 460 and the second switch 470 can be included in the power transceiver 330 unlike the first switch 430, the second switch 435, and the third switch 440 mentioned above through FIG. 4A.

In various embodiments, a control circuit (e.g., 350 of FIG. 3 or FIG. 4A) can set a state of the first switch 460 to a first state of connecting the first capacitor 410 and the second capacitor 415 to a ground terminal, while the electronic device 301 operates in a first mode (or by a first function). For example, the control circuit 350 can maintain the state of the first switch 460 within the power transceiver 330 in the first state, or convert the same into the first state, in order to provide a path of an electrical signal which passes through the first capacitor 410 and the second capacitor 415, while the electronic device 301 operates in the first mode.

In various embodiments, the control circuit 350 can set the state of the first switch 460 to a second state of disconnecting the first capacitor 410 and the second capacitor 415 from the ground terminal, while the electronic device 301 operates in a second mode (or by a second function). For example, the control circuit 350 can maintain the state of the first switch 460 within the power transceiver 330 in the second state, or convert the same into the second state, in order to shut down the path of the electrical signal which passes through the first capacitor 410 and the second capacitor 415, while the electronic device 301 operates in the second mode.

In various embodiments, the control circuit 350 can control a connection state of the fourth capacitor 425 in order to transmit information to the external electronic device offering power to the electronic device 301, while the electronic device 301 operates in the second mode. For example, the control circuit 350 can provide an electrical path passing through the fourth capacitor 425, by electrically connecting the fourth capacitor 425 and the ground terminal by using the second switch 470, while the electronic device 301 operates in the second mode. For another example, the control circuit 350 can electrically disconnect the fourth capacitor 425 and the ground terminal by using the second switch 470, while the electronic device 301 operates in the first mode.

In various embodiments, while the electronic device 301 operates in the second mode, the control circuit 350 can control a connection state of the fourth capacitor 425, thereby modulating information which will be transmitted to the external electronic device offering power to the electronic device 301. For example, the control circuit 350 can change the connection state of the fourth capacitor 425, thereby increasing a modulation depth of the information which will be transmitted. However, an embodiment is not limited to this.

An electronic device (e.g., the electronic device 301) of various embodiments described above can include a power transceiver (e.g., the power transceiver 330), a coil (e.g., the coil 360) configured to transmit, by wireless, a signal for offering power to an external electronic device, or receive, by wireless, a signal for acquiring power from the external electronic device, a first capacitor (e.g., the first capacitor 410) electrically connectable to the coil, a first switch (e.g., the first switch 430) configured to electrically connect, or disconnect, an end of the first capacitor to a ground terminal, a second capacitor (e.g., the second capacitor 415) electrically connectable to the coil, a second switch (e.g., the second switch 435) configured to electrically connect, or disconnect, an end of the second capacitor to the ground terminal, a third capacitor (e.g., the third capacitor 430) electrically connectable to the power transceiver, a fourth capacitor (e.g., the fourth capacitor 425) electrically connectable the third capacitor and the power transceiver, a third switch (e.g., the third switch 440) configured to electrically connect, or disconnect, an end of the fourth capacitor to the ground terminal, and a control circuit (e.g., the control circuit 350).

In various embodiments, the control circuit can be configured to control the first switch, the second switch, or a combination of the first switch and the second switch, in order to electrically connect the first capacitor, the second capacitor, or a combination of the first capacitor and the second capacitor to the ground terminal, while the electronic device operates in a first mode for offering power to a first external electronic device, and control the first switch and the second switch, in order to electrically disconnect the first capacitor and the second capacitor from the ground terminal, and control the third switch in order to control a path of an electrical signal which passes through the fourth capacitor, while the electronic device operates in a second mode for acquiring power from a second external electronic device.

In various embodiments, the coil can be configured to offer the power to the first external electronic device by transmitting at least one second signal electromagnetically induced from a first signal which is received from the power transceiver through the first capacitor, the second capacitor, or a combination of the first capacitor and the second capacitor, while the electronic device operates in the first mode.

In various embodiments, the electronic device can further include a battery (e.g., the battery 320) electrically connected to the power transceiver, and the coil can be configured to offer, to the power transceiver, a fourth signal electromagnetically induced from a third signal received from the second external electronic device, while the electronic device operates in the second mode, and the power transceiver can be configured to charge the battery by offering a fifth signal provided on the basis of the fourth signal, to the battery.

In various embodiments, the first capacitor and the second capacitor each can be configured to provide a first signal by decreasing a voltage change degree of a signal received from the power transceiver, while the electronic device operates in the first mode, and transmit the first signal to the coil.

In various embodiments, the fourth capacitor can be used to modulate a signal which will be transmitted from the electronic device to the second external electronic device, while at least one operation for acquiring power from the second external electronic device is performed.

In various embodiments, the electronic device can further include a communication circuit (e.g., the communication circuit 340) configured to perform communication on a plurality of frequency bands including at least one specified frequency band, and configured to transmit or receive a signal through another antenna distinct from the coil, and the control circuit can be further configured to identify that a frequency used for communication between the electronic device and a third external electronic device is within the at least one specified frequency band, while the electronic device operates in the first mode and, on the basis of the identifying, change a capacitance value of the first capacitor, the second capacitor, or the combination of the first capacitor and the second capacitor into a value corresponding to the frequency used for communication between the electronic device and the third external electronic device.

In various embodiments, the control circuit can be configured to receive, from another control circuit within the communication circuit, information about a frequency band of a cell used for communication between the electronic device and the third external electronic device, a channel of the cell, an intensity of a signal received from the third external electronic device, or a combination of the frequency band of the cell, the channel of the cell and the intensity of the signal and, on the basis at least of the received information, identify that the frequency used for communication between the electronic device and the third external electronic device is within the at least one specified frequency band, while the electronic device operates in the first mode.

In various embodiments, the control circuit can be further configured to decrease a current value of the first signal transmitted from the power transceiver to the coil through the first capacitor, the second capacitor, or the combination of the first capacitor and the second capacitor, on the basis of identifying that the intensity of the signal is less than a specified intensity.

In various embodiments, an electrical path passing through the first capacitor, the second capacitor, or the combination of the first capacitor and the second capacitor can be provided in response to the first capacitor, the second capacitor, or the combination of the first capacitor and the second capacitor being connected to the ground terminal by the control of the control circuit, and can be shut down in response to the first capacitor and the second capacitor being disconnected from the ground terminal by the control of the control circuit.

In various embodiments, a phase of a signal received by an end of the coil while the electronic device operates in the first mode can be opposite to a phase of a signal received by the other end opposite to the end of the coil.

In various embodiments, the first mode can be converted from the second mode, on the basis of a user input which is received while the electronic device is in the second mode.

In various embodiments, the control circuit can be configured to, in response to conversion from the second mode to the first mode, control the first switch, the second switch, or the combination of the first switch and the second switch, in order to connect the first switch disconnected from the ground terminal, the second switch disconnected from the ground terminal, or a combination of the disconnected first switch and the disconnected second switch, to the ground terminal.

In various embodiments, the third capacitor can be used to set a resonance frequency of a signal for offering the power to the first external electronic device.

In various embodiments, the fourth capacitor can be electrically connected with, or disconnected from, the third capacitor and the power transceiver according to the control of the control circuit, while the electronic device operates in the second mode, and information transmitted to the second external electronic device can be modulated on the basis of the connection or disconnection of the fourth capacitor.

In various embodiments, a capacitance value of the fourth capacitor can be variable in order to increase a modulation depth of the information.

An electronic device of various embodiments can include a communication circuit, a power transceiver, a coil configured to transmit, by wireless, a signal for offering power to an external electronic device, or receive, by wireless, a signal for acquiring power from the external electronic device, connection circuitry connecting between the coil and the power transceiver, and a control circuit.

In various embodiments, the control circuit can be configured to identify that a frequency used for communication between the electronic device and a second external electronic device changes from a first frequency within a specified frequency band to a second frequency within the specified frequency band, by using the communication circuit supporting communication through an antenna distinct from the coil, while the electronic device operates in a first mode for offering power to a first external electronic device, and change an impedance value of the connection circuitry, on the basis of the identifying.

In various embodiments, the control circuit can be configured to, while the electronic device operates in the first mode, receive a signal indicating that the frequency used for communication between the electronic device and the second external electronic device is changed from the first frequency to the second frequency and, in response to the reception of the signal, change the impedance value of the connection circuitry.

In various embodiments, the impedance value can be maintained independently from changing the frequency used for communication between the electronic device and the second external electronic device from the first frequency to the second frequency, while the electronic device operates in a second mode for acquiring power from a third external electronic device.

In various embodiments, the connection circuitry can include a first capacitor configured to electrically connect the coil and the power transceiver in the first mode, and the control circuit can be configured to change the impedance value of the connection circuitry by changing a capacitance value of the first capacitor, on the basis of the identifying.

In various embodiments, the first capacitor can be constructed as a variable capacitor.

Figure 5:
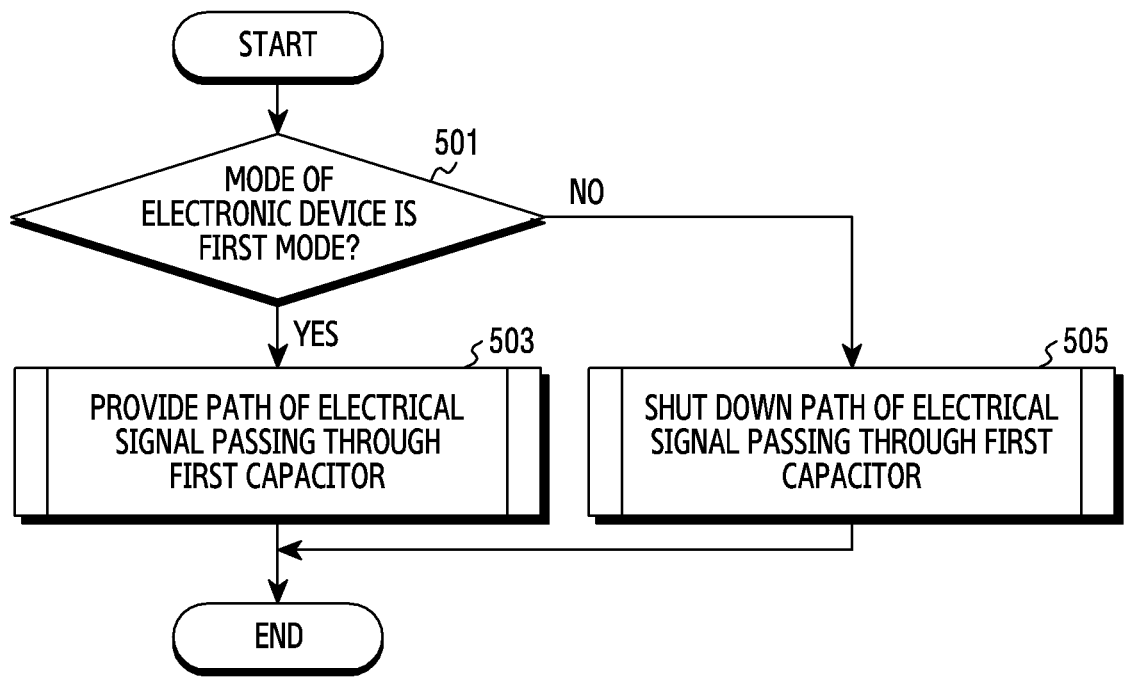
FIG. 5 is a diagram illustrating an example of an operation of an electronic device according to various embodiments.

FIG. 5 is a diagram illustrating an example of an operation of an electronic device according to various embodiments. This operation can be performed by the electronic device 101 illustrated in FIG. 1, the processor 120 of FIG. 1 included in the electronic device 101, the electronic device 301 illustrated in FIG. 3, or the control circuit 350 of FIG. 3 included in the electronic device 301. In the following, operations performed by the control circuit 350 of the electronic device 301 are described as an example.

Referring to FIG. 5, in operation 501, the control circuit 350 can identify whether a mode of the electronic device 101 or 301 (below, referred to as 301) is a first mode (or a first function) or is a second mode (or a second function). For example, the electronic device 301 can operate in the second mode for acquiring power from an external electronic device by a default mode (or a default function). The control circuit 350 can identify the reception or non-reception of a user input for converting the second mode into a first mode (e.g., a mode of offering power to the external electronic device), while the electronic device 301 operates in the second mode. The control circuit 350 can determine the mode of the electronic device 301 as the first mode, on the basis of receiving the user input. The control circuit 350 can determine the mode of the electronic device 101 as the second mode, on the basis of not receiving the user input. In various embodiments, in response to the electronic device 301 operating in the first mode, the control circuit 350 can perform operation 503. In various embodiments, in response to the electronic device 301 operating in the second mode, the control circuit 350 can perform operation 505.

In operation 503, while the electronic device 301 operates in the first mode, the control circuit 350 can provide a path of an electrical signal which passes through a first capacitor (e.g., 410 of FIG. 4A or FIG. 4B). For example, the control circuit 350 can control a switch connected to the first capacitor 410 wherein the first capacitor 410 is electrically connected to a ground terminal, thereby providing a path of an electrical signal which passes through the first capacitor 410. In various embodiments, while a coil (e.g., 360 of FIG. 4A or FIG. 4B) and a power transceiver (e.g., 330 of FIG. 4B) are electrically connected through the first capacitor 410, a fourth capacitor (e.g., 425 of FIG. 4A or FIG. 4B) can be electrically disconnected from the ground terminal. In various embodiments, while the electronic device 301 operates in the first mode, the first capacitor 410 can decrease a voltage change degree of a signal received from the power transceiver 330, thereby providing a first signal, and transmit or output the first signal to the coil 360. The coil 360 can transmit or output a second signal electromagnetically induced from the first signal, thereby offering power to a first external electronic device located in proximity to the coil 360.

In operation 505, while the electronic device 301 operates in the second mode, the control circuit 350 can shut down a path of an electrical signal which passes through the first capacitor 410. For example, the control circuit 350 can control the switch connected to the first capacitor 410 wherein the first capacitor 410 is electrically disconnected from the ground terminal, thereby shutting down the path of the electrical signal which passes through the first capacitor 410.

In various embodiments, while the electronic device 301 operates in the second mode, the control circuit 350 can change a connection state of the fourth capacitor 425, in order to modulate information which will be transmitted to a second external electronic device offering power. In various embodiments, the fourth capacitor 425 can be used to modulate the information which will be transmitted to the second external electronic device.

In various embodiments, during a first time within a time duration in which the electronic device 301 operates in the second mode, the fourth capacitor 425 can be electrically connected to the ground terminal, and during a second time within the time duration, the fourth capacitor 425 can be electrically disconnected from the ground terminal. In various embodiments, the electronic device 301 can control the On/Off of a fourth switch (e.g., 440 of FIG. 4A or 470 of FIG. 4B) and perform an ASK modulation operation. In various embodiments, to increase a modulation depth of information which will be transmitted to the second external electronic device offering power to the electronic device 301, the control circuit 350 can change a state of a switch connected to the fourth capacitor 425, thereby providing a path of an electrical signal which passes through the fourth capacitor 425 during the first time duration, and shut down the path of the electrical signal which passes through the fourth capacitor 425 during the second time duration. Or, to increase the modulation depth of the information which will be transmitted to the second external electronic device, the control circuit 350 can vary the fourth capacitor 425 as well.

As described above, the electronic device 301 of various embodiments can efficiently offer power to the external electronic device by providing a path of an electrical signal which passes through the first capacitor 410, while the electronic device 301 operates in the first mode, and efficiently modulate the information which will be transmitted to the external electronic device by controlling the path of the electrical signal which passes through the fourth capacitor 425, while the electronic device 301 operates in the second mode.

Figure 6:
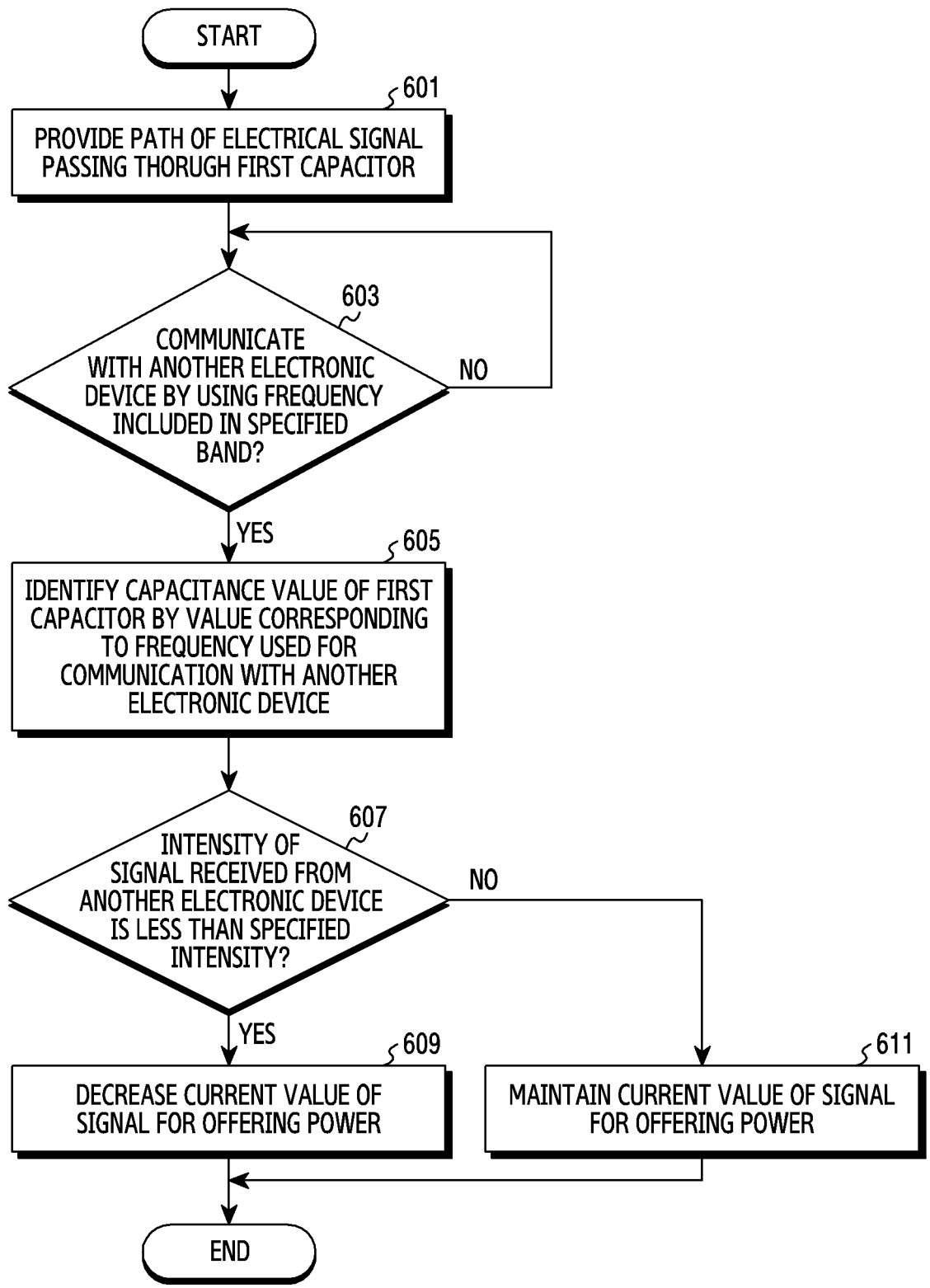
FIG. 6 is a diagram illustrating an example of an operation of an electronic device controlling a first capacitor according to various embodiments.

FIG. 6 is a diagram illustrating an example of an operation of an electronic device controlling a first capacitor according to various embodiments. This operation can be performed by the electronic device 101 illustrated in FIG. 1, the processor 120 of FIG. 1 included in the electronic device 101, the electronic device 301 illustrated in FIG. 3, or the control circuit 350 of FIG. 3 included in the electronic device 301. In the following, operations performed by the control circuit 350 of the electronic device 301 are described as an example.

Operation 601 to operation 611 of FIG. 6 can be related to operation 503 of FIG. 5.

Referring to FIG. 6, in operation 601, the control circuit 350 can electrically connect a coil (e.g., 360 of FIG. 4A or FIG. 4B) and a power transceiver (e.g., 330 of FIG. 4B) through a first capacitor (e.g., 410 of FIG. 4A or FIG. 4B). Operation 601 can correspond to operation 503 of FIG. 5.

In operation 603, the control circuit 350 can identify whether the electronic device 301 communicates with another external electronic device by using a frequency of a specified band among a plurality of frequency bands used for communication with an external electronic device. For example, the communication with the external electronic device can be performed through an antenna distinct from a coil (e.g., 360 of FIG. 4A or FIG. 4B). For example, the communication with the another external electronic device can mean that the electronic device 301 performs data exchange for an application operation by using a first or second network (e.g., 198 or 199 of FIG. 1) while performing the application operation. For example, the frequency of the specified band can mean a frequency between 700 (MHz) to 900 (MHz). However, an embodiment is not limited to this. In various embodiments, the control circuit 350 can identify whether the electronic device 301 communicates with the another external electronic device by using the frequency of the specified band among the plurality of frequency bands, on the basis of information received from a communication processor of a communication circuit (e.g., 340 of FIG. 3). In various embodiments, the control circuit 350 can maintain an identifying operation of operation 603, in response to communicating with the another external electronic device by using a frequency of a band other than the frequency of the specified band among the plurality of frequency bands. The control circuit 350 can perform operation 605, on the basis of identifying the communication with the another external electronic device by using the frequency of the specified band among the plurality of frequency bands.

In operation 605, the control circuit 350 can identify a capacitance ($C_1$) value of the first capacitor 410 by a value corresponding to the frequency used for the communication with the another external electronic device. For example, in response to the frequency used for the communication with the another external electronic device being 720 (MHz), the control circuit 350 can identify the value of the capacitance ($C_1$) by 'a' corresponding to 720 (MHz), and in response to the frequency used for the communication with the another external electronic device being 820 (MHz), the control circuit 350 can identify the value of the capacitance ($C_1$) by 'b' corresponding to 820 (MHz). The control circuit 350 can transmit a signal for offering power to the external electronic device by using the first capacitor 410 having the capacitance ($C_1$) value changed into the identified value. The electronic device 301 of various embodiments can prevent a signal for offering power to the external electronic device from acting as interference in the communication with the another external electronic device, through the change of the capacitance ($C_1$) value.

In operation 607, after changing the capacitance ($C_1$) value of the first capacitor 410, the control circuit 350 can identify whether an intensity of a signal received from the another external electronic device is less than a specified intensity. For example, after changing the capacitance ($C_1$) value of the first capacitor 410, the control circuit 350 can receive information about a received signal strength (RSS) of the signal from the communication circuit 340. On the basis of the received information, the control circuit 350 can identify whether the intensity of the signal received from the another external electronic device is less than the specified intensity. In various embodiments, the control circuit 350 can perform operation 609, on the basis of identifying that the intensity of the signal is less than the specified intensity. In various embodiments, the control circuit 350 can perform operation 611, on the basis of identifying that the intensity of the signal is equal to or is greater than the specified intensity.

In operation 609, the control circuit 350 can decrease a current value of a signal for offering power to the external electronic device, on the basis of identifying that the intensity of the signal is less than the specified intensity. For example, the control circuit 350 can decrease the current value of the signal, in order to prevent the signal from acting as interference in the communication with the another external electronic device. The decrease degree of the current value can be changed according to a magnitude of the intensity of the signal. For example, in response to the magnitude of the intensity of the signal being a first intensity less than the specified intensity, the control circuit 350 can decrease the current value as much as 'a', and in response to the magnitude of the intensity of the signal being a second intensity less than the specified intensity and greater than the first intensity, the control circuit 350 can decrease the current value as much as 'b'.

In operation 611, the control circuit 350 can maintain the current value of the signal for offering power to the external electronic device, on the basis of identifying that the intensity of the signal is equal to or is greater than the specified intensity. For example, the control circuit 350 can maintain the current value, in order to maintain an efficiency of power offering to the external electronic device, on the basis of identifying that the intensity of the signal is equal to or is greater than the specified intensity.

According to various embodiments, operation 607 to operation 611 of FIG. 6 can be performed independently from operation 601 to operation 605 of FIG. 6 as well, and can be omitted as well.

As described above, while the electronic device 301 operates in a first mode (or by a first function), the electronic device 301 of various embodiments can adaptively change the capacitance ($C_1$) value of the first capacitor 410, thereby maintaining communication performance between the another external electronic device and the electronic device 301 independently from offering power to the external electronic device.

Figure 7:
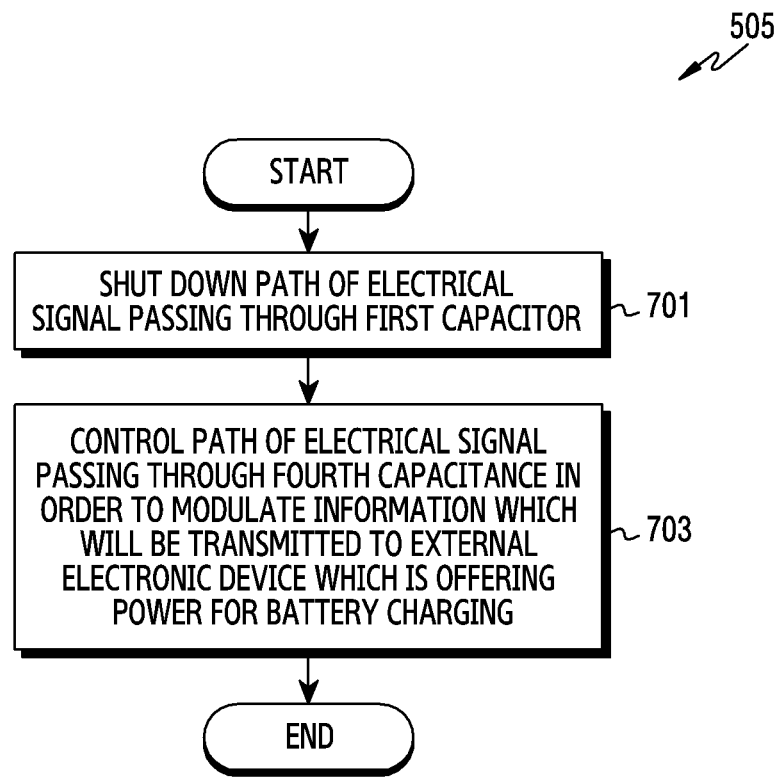
FIG. 7 is a diagram illustrating an example of an operation of an electronic device controlling a fourth capacitor according to various embodiments.

FIG. 7 is a diagram illustrating an example of an operation of an electronic device controlling a fourth capacitor according to various embodiments. This operation can be performed by the electronic device 101 illustrated in FIG. 1, the processor 120 of FIG. 1 included in the electronic device 101, the electronic device 301 illustrated in FIG. 3, or the control circuit 350 of FIG. 3 included in the electronic device 301. In the following, operations performed by the control circuit 350 of the electronic device 301 are described as an example.

Operations 701 and 703 of FIG. 7 can be related to operation 505 of FIG. 5.

Referring to FIG. 7, in operation 701, the control circuit 350 can shut down a path of an electrical signal which passes through a first capacitor (e.g., 410 of FIG. 4A or FIG. 4B). Operation 701 can correspond to operation 505 of FIG. 5.

In operation 703, the control circuit 350 can control a path of an electrical signal which passes through a fourth capacitor (e.g., 425 of FIG. 4A or FIG. 4B), in order to modulate information which will be transmitted to an external electronic device offering power so as to charge a battery (e.g., 280 of FIG. 2). For example, the control circuit 350 can provide or shut down the path of the electrical signal which passes through the fourth capacitor 425, in order to increase a difference between symbols included in the information and, in relation with this, can change a state of a switch connected with the fourth capacitor 425.

Figure 8:
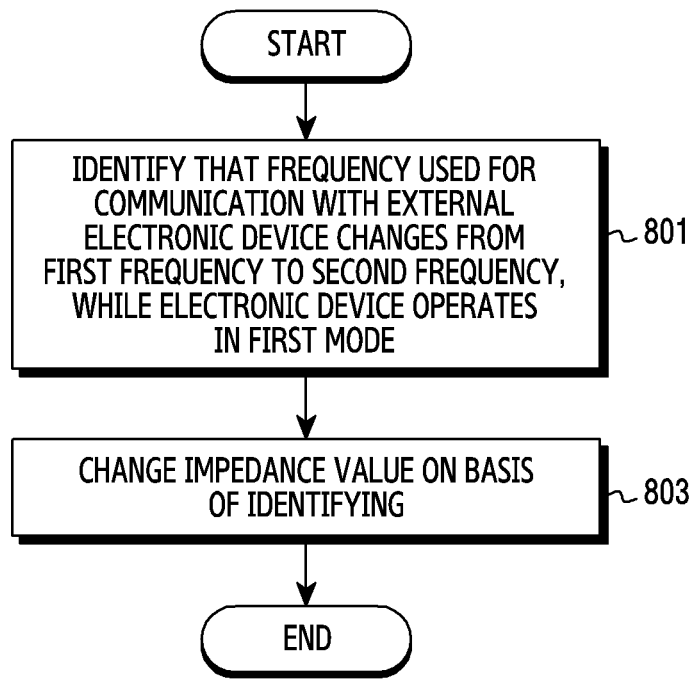
FIG. 8 is a diagram illustrating another example of an operation of an electronic device according to various embodiments.

FIG. 8 is a diagram illustrating another example of an operation of an electronic device according to various embodiments. This operation can be performed by the electronic device 101 illustrated in FIG. 1, the processor 120 of FIG. 1 included in the electronic device 101, the electronic device 301 illustrated in FIG. 3, or the control circuit 350 of FIG. 3 included in the electronic device 301. In the following, operations performed by the control circuit 350 of the electronic device 301 are described as an example.

Referring to FIG. 8, in operation 801, while the electronic device 301 operates in a first mode (or by a first function) for offering power to a first external electronic device, the control circuit 350 can identify that a frequency used for communication between the electronic device 301 and a second external electronic device is changed from a first frequency within a specified frequency band to a second frequency within the specified frequency band, by using a second communication circuit included in a communication circuit (e.g., 340 of FIG. 3). For example, the second communication circuit can support communication which is performed through an antenna distinct from a coil (e.g., 360 of FIG. 4A or FIG. 4B). For example, while offering power to the first external electronic device by using the coil 360, a first capacitor (e.g., 410 of FIG. 4A or FIG. 4B), and a power transceiver (e.g., 330 of FIG. 4B), the control circuit 350 can receive, from the second communication circuit, a signal indicating that the frequency used for communication between the electronic device 301 and the second external electronic device is changed from the first frequency to the second frequency and, in response to the reception of the signal, can identify that the frequency used for communication between the electronic device 301 and the second external electronic device is changed from the first frequency within the specified frequency band to the second frequency within the specified frequency band.

In operation 803, the control circuit 350 can change an impedance value of a connection circuit electrically connecting the coil 360 and the power transceiver 330, on the basis of the identifying. For example, the connection circuit can include the first capacitor 410, the second capacitor (e.g., 415 of FIG. 4A), a first switch (e.g., 430 of FIG. 4A), a second switch (e.g., 435 of FIG. 4A), or a combination thereof. For example, in response to receiving from the second communication circuit included in the communication circuit 340 the signal indicating that the frequency used for communication between the electronic device 101 and the second external electronic device is changed from the first frequency to the second frequency, the control circuit 350 can change the impedance value of the connection circuit. For example, in response to the identifying or the receiving, the control circuit 350 can change a capacitance ($C_1$) value of the first capacitor 410, thereby changing the impedance value of the connection circuit. According to various embodiments, the impedance value can be maintained independently from changing the frequency used for communication between the electronic device 301 and the second external electronic device from the first frequency to the second frequency, while the electronic device 301 operates in a second mode (or by a second function) for acquiring power from a third external electronic device. In other words, while the electronic device 301 operates in the second mode, the control circuit 350 can electrically disconnect the first capacitor 410 from the ground terminal, independently from changing the frequency used for communication between the electronic device 301 and the second external electronic device from the first frequency to the second frequency.

As described above, the electronic device 301 of various embodiments can stably perform communication with another external electronic device while offering power to an external electronic device, by changing a capacitance ($C_1$) value of the first capacitor 410 according to a frequency change.

Methods of embodiments mentioned in the claims or specification of the present disclosure can be implemented in the form of hardware, software, or a combination of hardware and software.

In response to being implemented by software, a computer-readable storage media storing one or more programs (software modules) can be offered. The one or more programs stored in the computer-readable storage media are configured to be executable by one or more processors within an electronic device. The one or more programs include instructions for enabling the electronic device to execute the methods of the embodiments stated in the claims or specification of the present disclosure.

These programs (i.e., software modules and/or software) can be stored in a random access memory (RAM), a non-volatile memory including a flash memory, a read only memory (ROM), an electrically erasable programmable ROM (EEPROM), a magnetic disc storage device, a compact disc-ROM (CD-ROM), digital versatile discs (DVDs), an optical storage device of another form, and/or a magnetic cassette. Or, it can be stored in a memory that is configured in combination of some or all of them. Also, each configured memory can be included in plural as well.

Also, the program can be stored in an attachable storage device that can access via a communication network such as the Internet, an intranet, a local area network (LAN), a wireless LAN (WLAN) or a storage area network (SAN), or a communication network configured in combination of them. This storage device can access a device performing an embodiment of the present disclosure via an external port. Also, a separate storage device on the communication network can access the device performing the embodiment of the present disclosure as well.

In the aforementioned concrete embodiments of the present disclosure, a component included in the disclosure has been expressed in a singular form or a plural form according to a proposed concrete embodiment. But, the expression of the singular form or plural form is selected suitable to a given situation for description convenience's sake, and the present disclosure is not limited to singular or plural components. Even if the component is a component expressed in the plural form, it can be constructed in the singular form, or even if the component is a component expressed in the singular form, it can be constructed in the plural form.

In a detailed description of the present disclosure, a concrete embodiment has been described, but it is undoubted that various modifications are available without departing from the scope of the present disclosure. Therefore, the scope of the present disclosure should not be limited to and defined by the described embodiment and should be defined by not only claims stated later but also equivalents to these claims.

The invention claimed is:

1. An electronic device comprising:
a coil outside a power transceiver;
the power transceiver configured to wirelessly transmit a signal for offering power to recharge a battery of an external electronic device to the external electronic device using the coil, or wirelessly receive a signal for acquiring power to recharge a battery of the electronic device from the external electronic device using the coil;
a control circuit; and
connection circuitry outside the power transceiver comprising:
a first capacitor configured to electrically connect to the coil;
a first switch configured to electrically connect, or disconnect, an end of the first capacitor to a ground terminal;
a second capacitor configured to electrically connect to the coil;
a second switch configured to electrically connect, or disconnect, an end of the second capacitor to the ground terminal;
a third capacitor configured to directly connect to the power transceiver;
a fourth capacitor configured to electrically connect to the third capacitor and the power transceiver; and
a third switch configured to electrically connect, or disconnect, an end of the fourth capacitor to the ground terminal,
wherein the control circuit is configured to:
control the first switch, the second switch, or a combination of the first switch and the second switch, in order to electrically connect the first capacitor, the second capacitor, or a combination of the first capacitor and the second capacitor to the ground terminal, while the electronic device operates in a first mode for offering power to a first external electronic device; and
control the first switch and the second switch, in order to electrically disconnect the first capacitor and the second capacitor from the ground terminal, and control the third switch in order to control a path of an electrical signal which passes through the fourth capacitor, while the electronic device operates in a second mode for acquiring power from a second external electronic device.

2. The electronic device of claim 1, wherein the first capacitor and the second capacitor each is configured to:
provide a first signal by decreasing a voltage change degree of a signal received from the power transceiver, while the electronic device operates in the first mode; and
transmit the first signal to the coil.

3. The electronic device of claim 2, further comprising a communication circuit configured to perform communication on a plurality of frequency bands comprising at least one specified frequency band, and configured to transmit or receive a signal through another antenna distinct from the coil, and
wherein the control circuit is further configured to:
identify that a frequency used for the communication between the electronic device and a third external electronic device is within the at least one specified frequency band, while the electronic device operates in the first mode, and
based on the identifying, change a capacitance value of the first capacitor, the second capacitor, or the combination of the first capacitor and the second capacitor into a value corresponding to the frequency used for the communication between the electronic device and the third external electronic device.

4. The electronic device of claim 3, wherein the control circuit is configured to:
receive, from another control circuit within the communication circuit, information about a frequency band of a cell used for the communication between the electronic device and the third external electronic device, a channel of the cell, an intensity of a signal received from the third external electronic device, or a combination of the frequency band of the cell, the channel of the cell and the intensity of the signal; and based on at least of the received information, identify that the frequency used for the communication between the electronic device and the third external electronic device is within the at least one specified frequency band, while the electronic device operates in the first mode.

5. The electronic device of claim 4, wherein the control circuit is further configured to decrease a voltage or current value of the first signal transmitted from the power transceiver to the coil through the first capacitor, the second capacitor, or the combination of the first capacitor and the second capacitor, based on identifying that the intensity of the signal is less than a specified intensity.

6. The electronic device of claim 2, wherein a phase of a signal received by an end of the coil while the electronic device operates in the first mode is opposite to a phase of a signal received by the other end opposite to the end of the coil.

7. The electronic device of claim 1, wherein the fourth capacitor is used to modulate, based on an amplitude shift keying (ASK) technique, a signal which configured to be transmitted from the electronic device to the second external electronic device, while at least one operation for acquiring power from the second external electronic device is performed.

8. The electronic device of claim 1, wherein an electrical path passing through the first capacitor, the second capacitor, or the combination of the first capacitor and the second capacitor
   is provided in response to the first capacitor, the second capacitor, or the combination of the first capacitor and the second capacitor being connected to the ground terminal by the control of the control circuit, and
   is shut down in response to the first capacitor and the second capacitor being disconnected from the ground terminal by the control of the control circuit.

9. The electronic device of claim 1, wherein the control circuit is configured to:
   in response to conversion from the second mode to the first mode, control the first switch, the second switch, or the combination of the first switch and the second switch, in order to connect the first switch disconnected from the ground terminal, the second switch disconnected from the ground terminal, or a combination of the disconnected first switch and the disconnected second switch, to the ground terminal.

10. The electronic device of claim 1, wherein the third capacitor is used to set a resonance frequency of a signal for offering power to the first external electronic device.

11. The electronic device of claim 1, wherein the fourth capacitor is electrically connected with, or disconnected from, the third capacitor and the power transceiver according to the control of the control circuit, while the electronic device operates in the second mode, and
   information transmitted to the second external electronic device is modulated based on the connection or disconnection of the fourth capacitor.

12. The electronic device of claim 11, wherein a capacitance value of the fourth capacitor is variable in order to increase a modulation depth of the information.

13. An electronic device comprising:
   a communication circuit;
   a coil;
   a power transceiver configured to wirelessly transmit a signal for offering power to recharge a battery of an external electronic device to the external electronic device using the coil, or wirelessly receive a signal for acquiring power to recharge a battery of the electronic device from the external electronic device using the coil;
   connection circuitry connecting between the coil and the power transceiver; and
   a control circuit,
   wherein the control circuit is configured to:
   identify that a frequency used for communication between the electronic device and a second external electronic device changes from a first frequency within a specified frequency band to a second frequency within the specified frequency band, by using the communication circuit supporting the communication through an antenna distinct from the coil, while the electronic device operates in a first mode for offering power to a first external electronic device; and
   change an impedance value of the connection circuitry, based on the identifying.

14. The electronic device of claim 13, wherein the impedance value is maintained independently from changing the frequency used for the communication between the electronic device and the second external electronic device from the first frequency to the second frequency, while the electronic device operates in a second mode for acquiring power from a third external electronic device.

15. The electronic device of claim 14, wherein the connection circuitry comprises a first capacitor configured to electrically connect the coil and the power transceiver in the first mode, and
   the control circuit is configured to change the impedance value of the connection circuitry by changing a capacitance value of the first capacitor, based on the identifying.

* * * * *